United States Patent
Bazzani

[11] Patent Number: 6,166,585
[45] Date of Patent: Dec. 26, 2000

[54] METHODS AND APPARATUS FOR A HIGH EFFICIENCY CHARGE PUMP THAT INCLUDES A MOSFET CAPACITOR OPERATING IN AN ACCUMULATION REGION

[75] Inventor: Cristiano Bazzani, Irvine, Calif.

[73] Assignee: Conexant Systems, Inc., Newport Beach, Calif.

[21] Appl. No.: 09/143,584

[22] Filed: Aug. 31, 1998

[51] Int. Cl.[7] ........................................ G05F 1/10
[52] U.S. Cl. ................................. 327/536; 327/537
[58] Field of Search .............................. 327/536, 537, 327/589, 530, 390

[56] References Cited

U.S. PATENT DOCUMENTS

| | | | |
|---|---|---|---|
| 4,670,669 | 6/1987 | Cottrell et al. | 307/297 |
| 4,739,191 | 4/1988 | Puar | 327/536 |
| 5,306,954 | 4/1994 | Chan et al. | 307/110 |
| 5,365,121 | 11/1994 | Morton et al. | 327/536 |
| 5,386,151 | 1/1995 | Folmsbee | 327/536 |
| 5,394,027 | 2/1995 | Park | 327/536 |
| 5,471,246 | 11/1995 | Nishima et al. | 348/322 |
| 5,539,351 | 7/1996 | Gilsdorf et al. | 327/379 |
| 5,677,645 | 10/1997 | Merritt | 327/536 |
| 5,740,109 | 4/1998 | Morton et al. | 365/185.18 |
| 5,920,470 | 7/1999 | Jin | 327/536 |
| 5,973,979 | 10/1999 | Chang et al. | 365/226 |

*Primary Examiner*—Jung Ho Kim
*Attorney, Agent, or Firm*—Snell & Wilmer, L.L.P.

[57] ABSTRACT

A charge pump circuit includes MOS capacitors configured to operate in the accumulation region, resulting in a substantially constant capacitance over the operational range. In a particularly preferred embodiment, a charge pump uses multiple stages of p-channel MOS capacitors. In accordance with a further aspect of the present invention, oxide thicknesses of the p-channel MOS capacitors are optimized in accordance with the requirements of each stage.

6 Claims, 4 Drawing Sheets

METHODS AND APPARATUS FOR A HIGH EFFICIENCY CHARGE PUMP THAT INCLUDES A MOSFET CAPACITOR OPERATING IN AN ACCUMULATION REGION

TECHNICAL FIELD

The present invention relates, generally, to high-efficiency charge pumps for use in integrated circuit devices and, more particularly, to charge pumps using, as capacitive elements, field-effect-transistors (FETs) operating in the accumulation region.

BACKGROUND ART AND TECHNICAL PROBLEMS

Modern integrated circuits often employ charge-pump circuitry in order to provide an internal supply voltage greater than that of the externally available power source. Such circuits are typically employed in lightweight, low-power products where power (e.g., battery power) and space are at a premium.

In general, charge pumps employ a combination of diode elements, capacitor elements, and switching elements to provide a substantially stable output voltage that is greater than the supply voltage ($V_{DD}$). In the most basic implementation of a charge pump, a capacitor is charged to a predetermined voltage during a first phase, then placed in series with a switched supply voltage during the second phase such that a portion of the combined charge is transferred through a diode element to a reservoir capacitor and/or a subsequent charge pump stages. As shown in FIG. 1, for example, a first stage 120 includes a capacitor 108 initially charged to $V_{DD}$. Upon application of the CK signal 112 during the first phase, the voltage at node 105 is increased. A portion of the charge at node 105 is then transferred to node 107 in the second stage 122 through the switching action of clock 112 and complementary clock 114. Thus, the capacitor charge is effectively "pumped" toward the output 107, through diodes 104 and 106, by the switching action of clocks 112 and 114. Output node 107 (which is typically attached to a load having a known input capacitance and resistance) thereby achieves a steady state voltage that is higher than $V_{DD}$ by about a factor of two (i.e., the actual output voltage is $2V_{DD} - 2V_d$, where $V_d$ is the diode threshold voltage, typically about 0.7V). Those skilled in the art will appreciate that additional stages may be used to further increase the output.

The charge pump capacitors may be implemented using a variety of technologies. For example, a metal-oxide-semiconductor field-effect-transistor (MOSFET) may be employed as a capacitive element by tying its, drain, source, and substrate terminals together and using the resultant structure as a two-terminal device. Illustrative cross-sectional and schematic diagrams of n-channel and p-channel MOS capacitors are shown in FIGS. 2A and 2B respectively. Due to their relatively high capacitance per unit area, MOS capacitors are desirable in cases where high-efficiency passive capacitors are not available.

Under static biasing conditions, the MOS capacitor can be characterized by three distinct biasing regions: accumulation, depletion, and inversion. The accumulation region corresponds to the case where the majority carrier concentration is greater near the oxide-semiconductor interface than in the bulk of the semiconductor. Ideally, for an n-channel MOS capacitor (referred to herein as an "nFET capacitor"), accumulation occurs when the gate voltage is less than zero. Depletion refers to the case where the carrier concentration at the oxide-semiconductor interface is less than that of the bulk semiconductor. In an nFET capacitor, this occurs when the gate voltage is greater than zero. Inversion occurs when the gate voltage is greater than or equal to the effective threshold voltage ($V_{th}$) of the structure, which depends on a number of factors, for example, channel dimensions and doping concentrations. The same biasing regions, using reversed polarities, also apply to p-channel MOS capacitors (referred to herein as "pFET capacitors").

The efficiency of a MOS capacitor is a strong function of biasing region. That is, the value of capacitance depends upon whether the MOS capacitor is operating in the accumulation, depletion, or inversion region. This dependence is clear in FIG. 3, which shows a qualitative voltage-capacitance relationship for a typical nFET capacitor. The capacitance value achieves a maximum value close to $C_{max}$ in accumulation region 302 and toward higher $V_G$ levels within inversion region 306. The capacitance value varies greatly within depletion region 304, and reaches a minimum at a point close to the onset of inversion (at approximately $V_G = V_{th} = 0.7$ V). This minimum capacitance is approximately one fourth of $C_{max}$. Additional background information regarding the capacitance-voltage characteristics of MOS structures can be found in a number of references, for example: Pierret, *Modular Series on Solid State Devices, Vol. IV: Field Effect Devices* (1983).

Known methods for using MOS capacitors in connection with charge pump circuitry exclusively involve using nFET capacitors operating in the inversion mode. The power supply voltage has traditionally been much higher than the threshold voltage of the FETs. As the voltage drop across the FET capacitor is usually higher than $(V_{DD} - V_d)/2$, the operation in deep inversion region is always guaranteed. Thus, this scheme is suitable for charge pumps whose internal supply voltage is substantially greater than Vth, and where the nFET capacitor remains relatively close to Cmax (i.e., operating in region 308 of FIG. 3). In recent years, however, in accordance with the trend toward miniaturization and power conservation in modern electronics, the internal supply voltage available to the charge pump has been reduced to the point that nFET capacitors have become less and less efficient. More particularly, the nFET has been forced to operate in a region closer to Vth, where its capacitance value is lower and can vary significantly during operation. Moreover, the FET threshold voltage cannot keep up with this trend because lower $V_{th}$ means higher leakage current, and higher leakage current results in higher power dissipation, thereby defeating the purpose of lowering $V_{DD}$.

Similarly, known systems also exhibit unsatisfactory area efficiency. Area efficiency refers to the overall area of the charge pump as compared to its ability to deliver a certain current at the generated voltage.

Moreover, the use of nFET capacitors is unsatisfactory in that the capacitance value in the inversion region is inversely related to switching frequency. That is, as charge pump clock speeds increase, the inversion portion (306) of FIG. 3 flattens out to a capacitance value much less than Cmax.

Systems are therefore needed to overcome these and other limitations of the prior art.

SUMMARY OF THE INVENTION

The present invention provides systems and methods for overcoming limitations of the prior art. In accordance with one aspect of the present invention, a charge pump circuit includes MOS capacitors configured to operate in the accumulation region, resulting in a substantially constant capacitance over the operational range. In a particularly preferred embodiment, a charge pump uses multiple stages of p-channel MOS capacitors. In accordance with a further aspect of the present invention, oxide thicknesses of the p-channel MOS capacitors are optimized in accordance with the requirements of each stage.

BRIEF DESCRIPTION OF THE DRAWING FIGURES

The subject invention will hereinafter be described in conjunction with the appended drying figures, wherein like numerals denote like elements, and:

DETAILED DESCRIPTION OF PREFERRED EXEMPLARY EMBODIMENTS

A charge pump apparatus in accordance with various aspects of the present invention includes one or more charge capacitors implemented using MOS capacitors, for example, pFET capacitors, operating in the accumulation region, thereby providing a consistent and high-area-efficiency capacitor.

Those skilled in the art will appreciate that the present invention may be incorporated into a variety of charge pump topologies. Accordingly, the exemplary embodiments described in detail below are not intended to be limiting.

Figure 4:
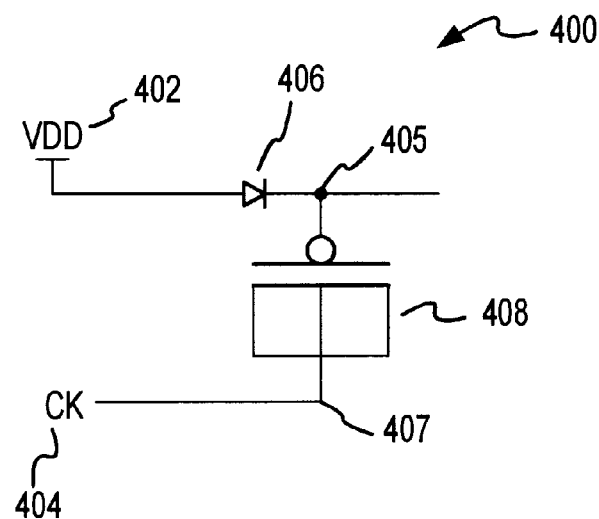
FIG. 4 shows an exemplary single charge pump stage in accordance with various aspects of the present invention.

Referring now to FIG. 4, a suitable charge pump stage in accordance with the present invention comprises, in its most basic form, a voltage supply 402, a diode 406, a switching apparatus 404, and a MOS capacitor 408.

Voltage supply 402 corresponds to the internally available supply voltage ($V_{DD}$), which may be derived from battery power, a transformer, or any other suitable power source. As it is a primary goal of the present invention to operate in contexts where power consumption is to be minimized, $V_{DD}$ might typically range between about 1–3 Volts, but may be lower.

Diode 406 provides for substantially unidirectional current flow during operation of the charge pump. Diode 406 may be implemented using a variety of conventional device configurations and technologies known in the semiconductor industry. For example, in a preferred embodiment, diode 406 may be implemented using an n-channel or p-channel MOSFET with the gate and drain tied together and the substrate grounded. Such configurations typically result in a forward-biased voltage drop of about 0.5–0.6V. Diode 406 preferably has one terminal connected to voltage supply 402 and one terminal connected to MOS capacitor 408 at node 405.

Switching apparatus 404 comprises one or more components for switching between the various phases necessary for operation of charge pump stage 400 and, where appropriate, any selected subsequent stages. In the illustrated embodiment, switching apparatus 404 consists of a clock (CK) for controlling the voltage of, or "boot-strapping," one terminal of diode 406 (node 407). Clock signal 404 may comprise any suitable amplitude and waveshape as determined by the particular application. In a preferred embodiment, CK signal 404 consists of a square wave alternating between $V_{DD}$ and ground with a frequency of about 10–20 MHz. Other switching configurations, such as MOSFET switches, may be employed, and faster or slower switching speeds may be applied. As detailed further below, the use of a MOS capacitor operating in the accumulation region has the advantage of retaining its efficiency as the switching frequency is increased.

MOS capacitor 408 comprises a MOSFET configured to operate as a MOS capacitor in the accumulation region. In a preferred embodiment, MOS capacitor 408 comprises a pFET capacitor having two terminals—the gate terminal connected to diode 406 at node 405, and the substrate terminal connected to switching apparatus 404 at node 407. Alternatively, MOS capacitor 408 may consist of an nFET capacitor with reversed polarity (i.e., gate terminal connected to CK 404 and substrate connected to node 405), which would also operate in accumulation mode. MOS capacitor 408 may be fabricated using a variety of conventional semiconductor manufacturing techniques known in the art.

Having thus described the components of a minimal charge pump stage 400, details of its operation will now be discussed. As described in further detail below, a complete charge pump solution typically incorporates multiple stages to achieve the desired output voltage. Nevertheless, various aspects of the present invention can be illustrated by this simplified structure.

Initially, capacitor 408 will have been precharged to $V_{DD}$ at node 405 (through diode 406), and CK node 407 will be grounded. As those skilled in the art will recognize, the precharge voltage at node 405 (i.e., the voltage just prior to activation of CK) will actually be reduced by the forward voltage of diode 41)6 (approximately 0.5–0.6 V in the case of a MOSFET based diode). For the purpose of simplicity, however, this forward voltage drop will be ignored in the discussion that follows.

Stage 400 alternates between two phases. During the first phase, when CK is raised to a predetermined voltage, the capacitor voltage at node 405 experiences an equivalent increase. In the illustrated embodiment where the CK voltage is equal to $V_{DD}$, the voltage at node 405 is doubled to $2*V_{DD}$. During the second phase, when CK is toggled back to ground, the excess charge at node 405 is transferred to a subsequent stage (as described further below), and node 405 returns to approximately $V_{DD}$.

Figure 3:
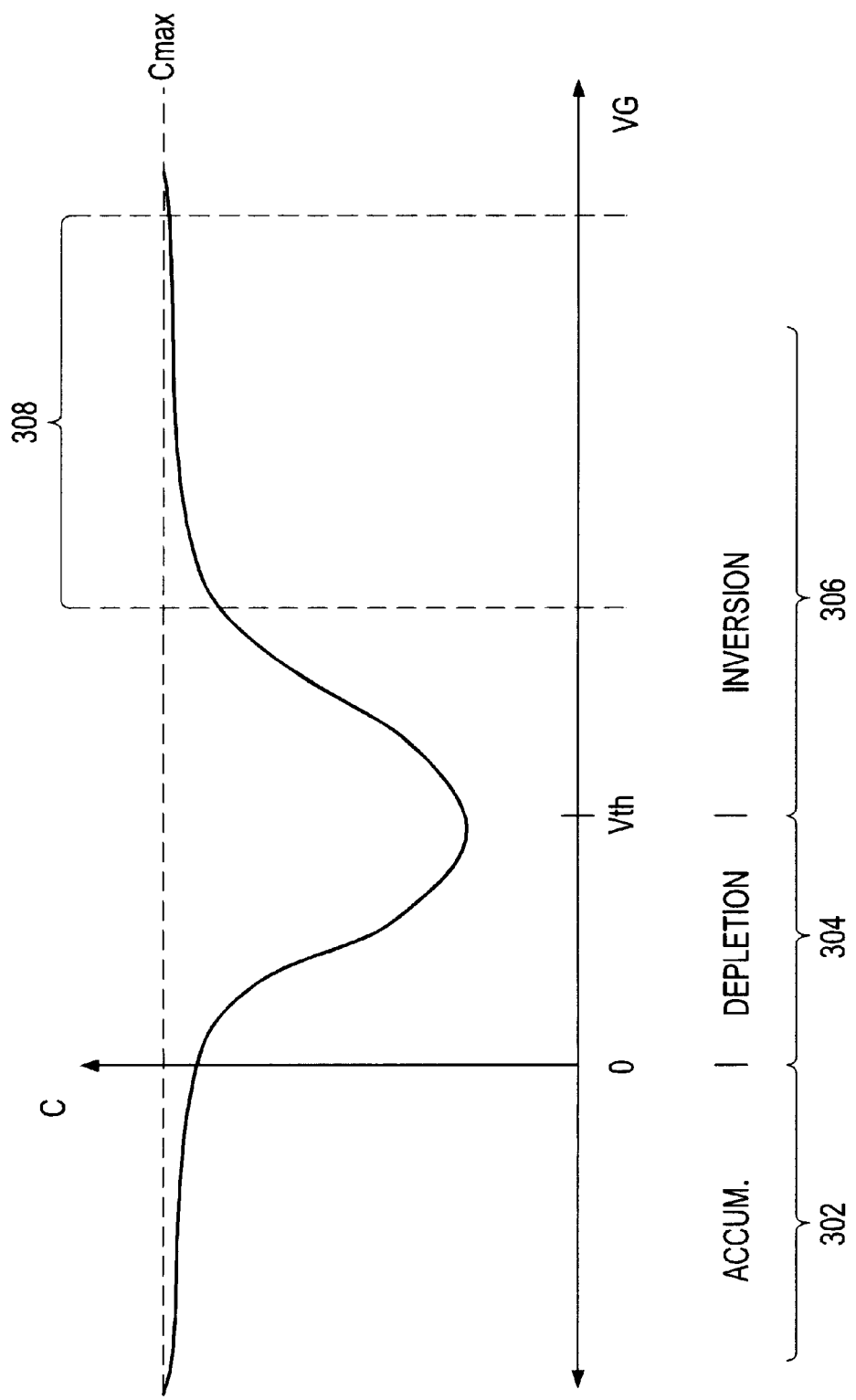
FIG. 3 is a qualitative graph describing the relationship between MOS capacitance and bias region.

Initially, assuming the subsequent stages all discharged and all the capacitors are equal, the voltage across the capacitor can drop as low as $V_{DD}/2$. After the first clock cycles, the value of the voltage drops by Q/C, where Q is the amount of charge transferred to the output and C is the capacitance value. As capacitor 408 is preferably implemented as a pFET operating with its gate tied to the positive $V_{DD}$ (through diode 406), capacitor 408 is always operating in the accumulation mode. More particularly ,the positive gate voltage causes an accumulation of majority carriers (electrons) near the oxide/silicon interface such that the carrier concentration is greater at the interface than in the bulk n substrate. Referring momentarily to FIG. 3, the accumulation region 302 is characterized by a relatively constant capacitance value close to $C_{max}$. Thus, the use of a pFET capacitor in connection with charge pump stage 400 results in optimum efficiency of that stage.

Figure 1:
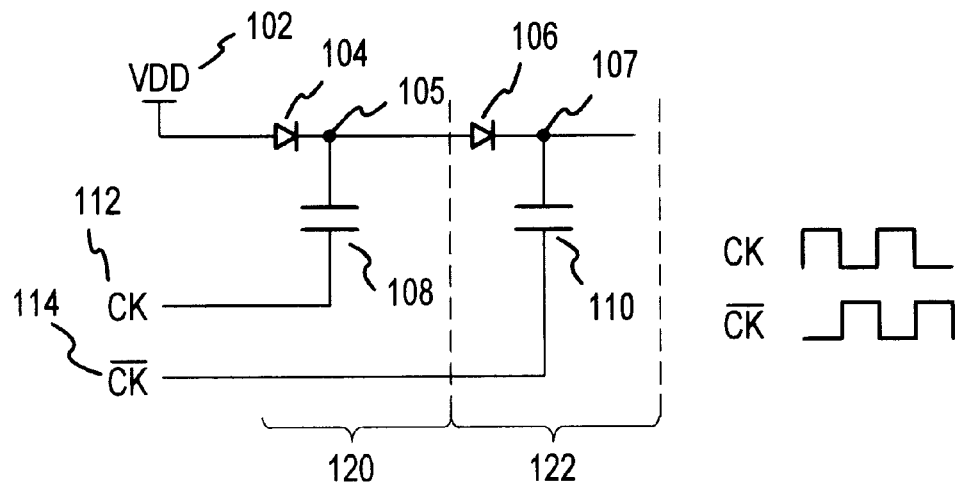
FIG. 1 is a schematic diagram of a simple charge pump circuit.
Figure 2A:
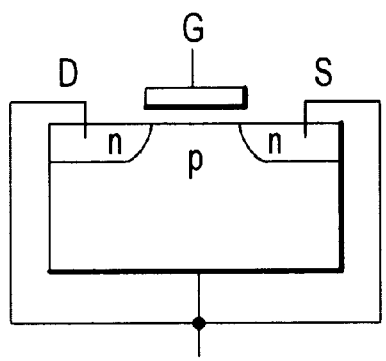
FIGS. 2A and 2B show illustrative cross-sectional and schematic diagrams of n-channel and p-channel MOS capacitors.
Figure 2A:
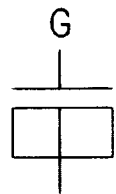
Figure 2B:
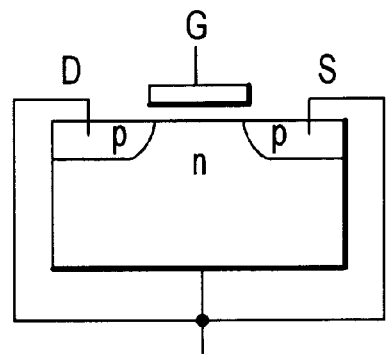
Figure 2B:
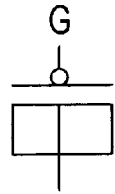
Figure 5:
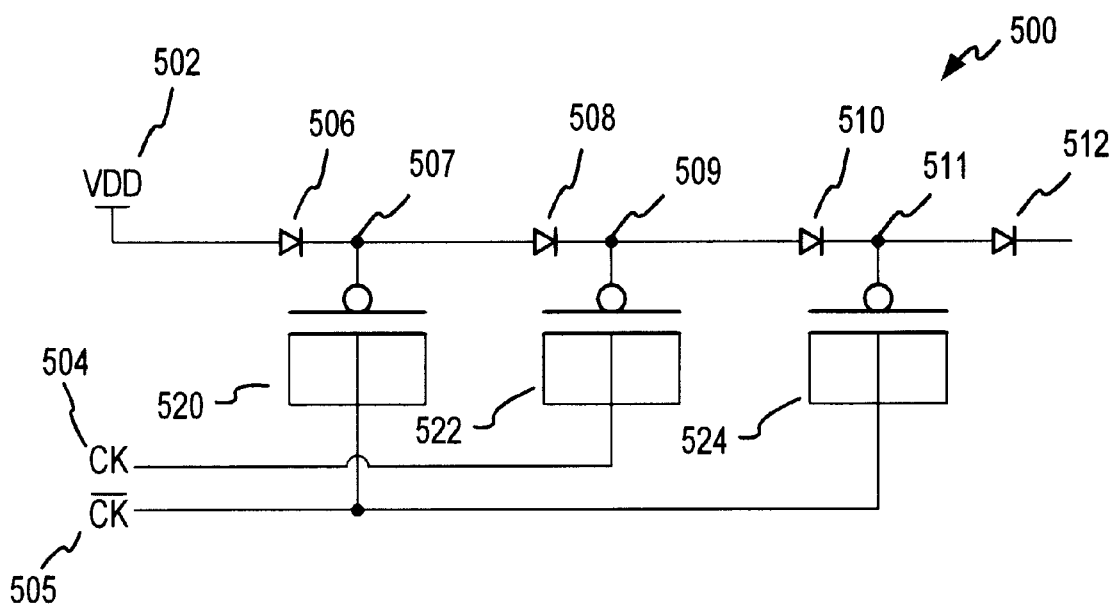
FIG. 5 is a schematic diagram of an exemplary charge pump circuit in accordance with the present invention.

The present invention may be employed in the context of a variety of charge pump topologies. For example, it will be apparent that the configuration described in the Background section in conjunction with FIG. 1 could be modified to achieve the objects of the present invention by employing MOS capacitors in place of capacitors 108 and 110 (preferably pFET capacitors). Similarly, FIG. 5 shows an embodiment of the present invention which includes four diode components (506, 508, 510, and 512) employed in conjunction with three pFET capacitors (520, 522, and 524), and clock signals 504 and 505, wherein the clocks are preferably non-overlapping complementary square waves. During a first phase, clock 504 goes high, causing charge to be transferred from node 509 to node 511. During a second phase, clock 505 goes high (and clock 504 goes low), raising the substrate voltage of pFET capacitors 520 and 524 such that charge is transferred from node 507 to node 509, and from node 511 to associated circuitry through diode 512. In this way, through alternation of clocks 504 and 505, the voltages at nodes 507, 509, and 511 eventually stabilize to successively higher voltages (i.e., voltages higher than $V_{DD}$).

It will be appreciated that the output of the various charge pump embodiments will typically be connected to a larger reservoir capacitor and/or a particular load resistance. The load resistance and capacitance can vary greatly depending upon the specific application in which the charge pump is being used.

Figure 6:
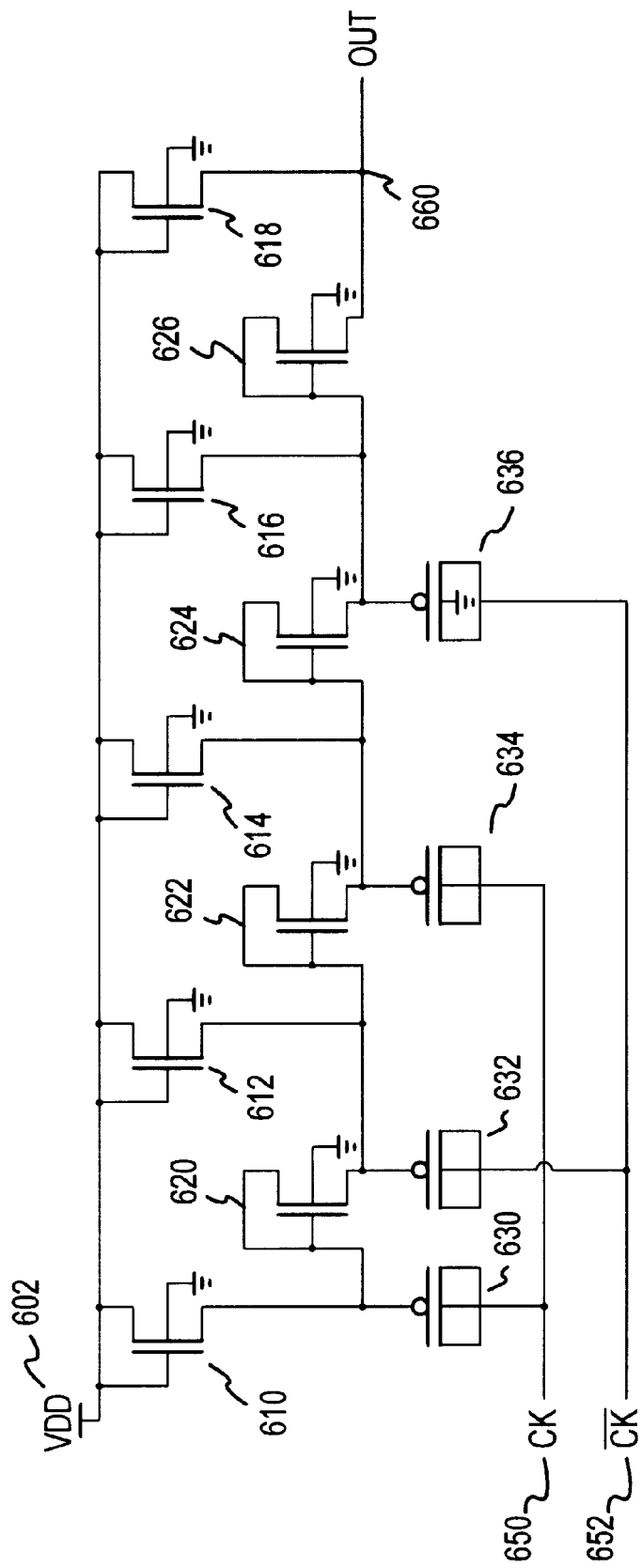
FIG. 6 is a schematic diagram of an alternate embodiment of a charge pump circuit in accordance with the present invention.

FIG. 6 presents yet another embodiment of the present invention wherein the diodes and capacitors are implemented using various MOSFET configurations. More particularly, four MOS capacitors are used (capacitors 630, 632, 634, and 636) along with nine MOSFET diodes (610, 612, 614, 616, 618, 620, 622, 624, and 626) in conjunction with complementary clock signals 650 and 652. Diode elements 612, 614, 616, and 618 act to precharge the various nodes to $V_{DD}$ (or, more precisely, $V_{DD}-V_{th}$) prior to application of clock signals 650 and 652.

This helps to reduce the time necessary for the charge pump to reach its steady-state output. In the illustrated embodiment, these diode elements are implemented using n-channel FETs. Alternatively, p-channel FETs or any other suitable diode element may be used.

MOSFET diodes 620, 622, 624, and 626 act to direct the movement of charge through the charge pump as described above in conjunction with FIGS. 4 and 5. In the illustrated embodiment, n-channel FETs are used. Alternatively, p-channel FETs or any other suitable diode element may be employed. As the voltage drop across these elements impacts on the efficiency of the pump, it is advantageous to use FETs with a low threshold voltage, for example, about 0.3 V.

While it is desirable for efficiency reasons to design the individual MOS capacitors such that they exhibit high capacitance (i.e., large areas with thin gate oxides), there are countervailing design considerations. With regard to oxide thickness, it is known that the rupture voltage is lower for thin oxides. Thus, in order to achieve certain reliability goals, it is prudent to use an oxide thickness that is capable of withstanding the voltage conditions likely to be incurred during operation.

As the various MOS capacitors 630, 632, 634, and 636 experience increasingly higher voltages, an optimum configuration from an area efficiency standpoint would employ thinner oxide for the early stages and thicker oxide for stages nearer to the output node where voltages are higher. The use of different oxide thicknesses is possible in modern semiconductor processing due to the fact that devices which typically employ charge pumps (e.g., Flash EEPROMs and the like) usually comprise a variety of MOSFET structures. As a result, a variety of oxide thickness are generally available.

In an exemplary embodiment as illustrated in FIG. 6, pFETs 630, 632, and 634 have oxide thickness of about 70–80 Å with an area of about 1750 $\mu m^2$, while nFET 636 has an oxide thickness of about 200–230 Å with an area of about 6500 $km^2$. Alternatively, a pFET with an oxide thickness of about 200 Å may be used for this element. Such a structure is capable of delivering 150 $\mu$A with an output of 5.5V starting from a $V_{DD}$ of 2.6V.

Those skilled in the art will recognize that the choice of sizes and thicknesses associated with each of the MOS capacitors may be optimized in accordance with $V_{DD}$, the number of stages, the clock frequency, the load (i.e., resistance and capacitance), the target output voltage, the available on-chip area, and the available range of oxide thicknesses.

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A charge pump apparatus for providing an output voltage greater than a supply voltage, said charge pump apparatus comprising:

at least one MOSFET capacitor having a first terminal and a second terminal, wherein said first terminal and said second terminal are biased such that said at least one MOSFET capacitor is operating in an accumulation region;

switching apparatus for switching said at least one MOSFET capacitor between at least two phases of operation.

2. The apparatus of claim 1, wherein said at least one MOSFET capacitor comprises a pFET capacitor.

3. The apparatus of claim 1, wherein said at least one MOSFET capacitor comprises a nFET capacitor.

4. A charge pump apparatus comprising a charge pump stage having an input and an output, said charge pump stage comprising:

a diode having a first terminal and a second terminal, said first terminal connected to said input, said second terminal connected to said output;

a MOSFET capacitor having a first terminal and a second terminal, said first terminal connected to said output, wherein said first terminal and said second terminal are biased such that said at least one MOSFET capacitor is operating in an accumulation region; and switching apparatus connected to said second terminal of said MOSFET capacitor for switching said MOSFET capacitor between a first phase and a second phase.

5. The apparatus of claim 4, wherein said MOSFET capacitor comprises a pFET capacitor and said first terminal of said MOSFET capacitor corresponds to the gate of said pFET capacitor.

6. The apparatus of claim 4, wherein said MOSFET capacitor comprises a nFET capacitor and said first terminal of said MOSFET capacitor corresponds to the substrate of said nFET capacitor.

* * * * *